Feb. 19, 1929.  
A. C. CARPENTER ET AL  
1,702,592  
FLEXIBLE MOISTUREPROOF CONTAINER AND METHOD OF MAKING THE SAME  
Filed Jan. 9, 1926   2 Sheets-Sheet 1
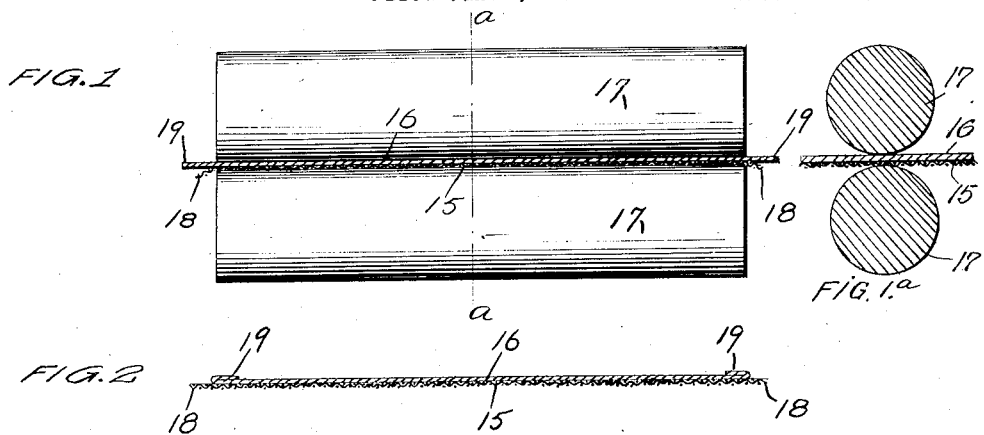
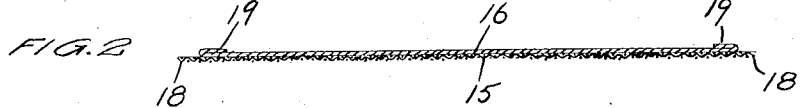
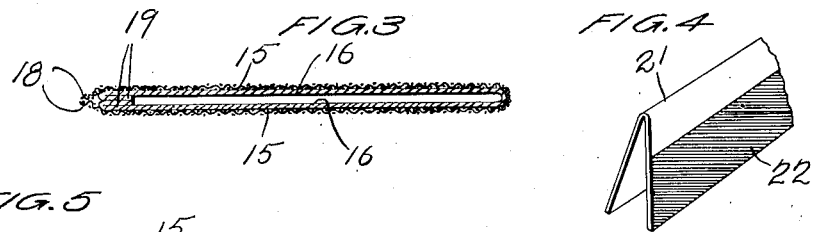
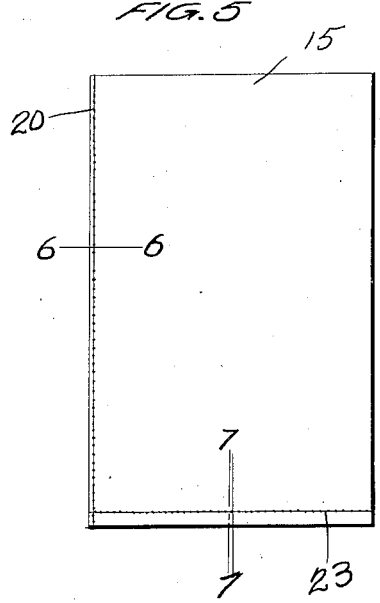
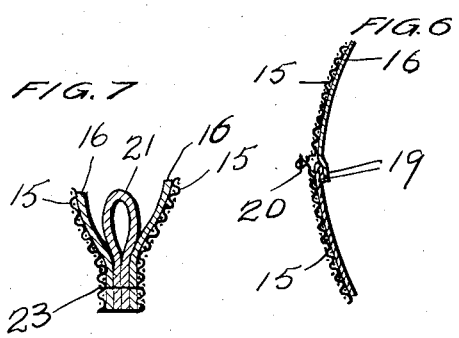
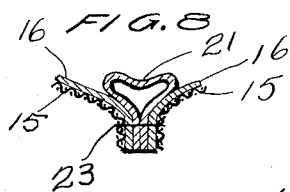
INVENTORS  
ALVIN C. CARPENTER  
ROBERT E. PIERCE  
CHARLES V. BRADY  
HOMER V. HOWES  
BY Edward E. Longan  
ATTY.

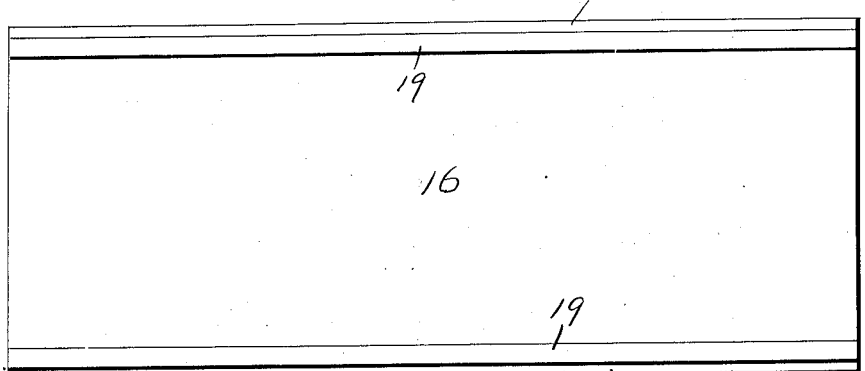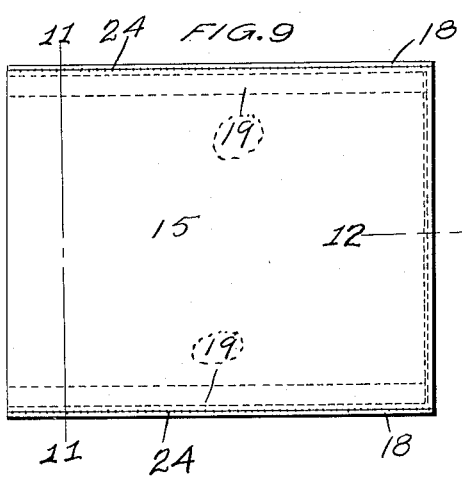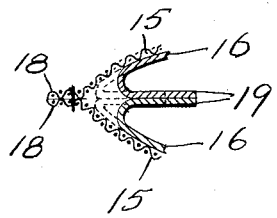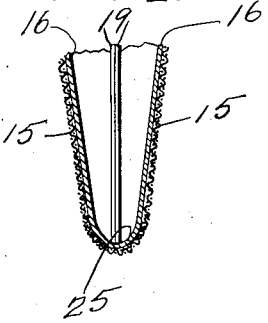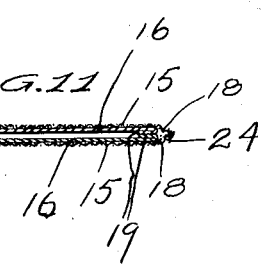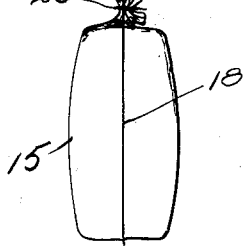

Patented Feb. 19, 1929.

1,702,592

UNITED STATES PATENT OFFICE.

ALVIN C. CARPENTER, ROBERT E. PIERCE, CHARLES V. BRADY, AND HOMER V. HOWES, OF ST. LOUIS, MISSOURI, ASSIGNORS TO BEMIS BRO. BAG CO., OF ST. LOUIS, MISSOURI, A CORPORATION OF MISSOURI.

FLEXIBLE MOISTUREPROOF CONTAINER AND METHOD OF MAKING THE SAME.

Application filed January 9, 1926. Serial No. 80,214.

Our invention relates to improvements in flexible moisture proof containers and method of making the same, and has for its primary object a flexible container for holding merchandise which becomes affected and loses certain of its qualities upon coming in contact with moisture. This makes our device especially useful for the packing of calcium chloride, quicklime and similar commodities.
Heretofore commodities of this kind were shipped either in metallic drums or in specially prepared barrels to protect them from moisture. With packages of this character a large storage space was necessary for the empty containers using up valuable and expensive space and if the commodity was shipped to any distance, it was very expensive to have the containers returned. Many thousands of our containers can be stored in a relatively small space and the cost of the container is so slight that it can be thrown away after being emptied.

Our device not alone is suitable for commodities which are to be protected from moisture but is also suitable for commodities which are shipped in a moist condition and which are to remain so. It can also be used in shipping articles which either lose their aroma or which have a disagreeable odor as the package when closed is practically air-tight.

A still further object is to construct a flexible container having an outer casing formed of some woven fabric and which is lined with a flexible inner casing of a material which is both moisture, sift and air proof; the lining being so constructed that no tearing strain is exerted on the lining as the container is filled. Our peculiar method of constructing the container is such that the outer fabric casing of the container can expand or stretch without any of this stretching being exerted on the lining or inner member of the container.

In the drawings:
Fig. 1 is a diagrammatic view showing the manner of securing the outer casing and lining together;

Fig. 1ª is a cross section taken on the line a—a of Fig. 1;
Fig. 2 is a sectional view of the lining and casing showing the second step in preparation;

Fig. 3 is a cross section of a container illustrating the manner of making the compensating joint along the side of the lining;

Fig. 4 is a fragmental perspective view of the flexible insert used in the bottom of one form of container;

Fig. 5 is a side elevation of a completed container in flattened position;

Fig. 6 is an enlarged section taken on the line 6—6 of Fig. 5;

Fig. 7 is an enlarged section taken on the line 7—7 of Fig. 5 illustrating the manner of placing the flexible insert;

Fig. 8 is a similar view showing the position the flexible insert assumes when the container is loaded;

Fig. 9 is a plan view of another form of container;

Fig. 10 is a plan view of the strip out of which the container illustrated in Fig. 9 is made;

Fig. 11 is a sectional view taken on the line 11—11 of Fig. 9;

Fig. 12 is an enlarged sectional view taken on the line 12—12 of Fig. 9;

Fig. 13 is an enlarged view of one edge of a container showing the manner in which the compensating joint of the liner or lining acts when the container is filled; and Fig. 14 is a side elevation of a container illustrating one method of closing the same after the commodity has been placed therein.

In carrying out our invention we employ a woven fabric 15. This fabric may be either jute or any other material used in bag making. 16 represents a sheet of material which is preferably air and moisture proof, one face of this sheet of material is coated with a non-drying adhesive, such as asphaltum or similar substance. After the sheet 16 has been thus prepared, it, together with the fabric 15, is passed between rollers 17. These rollers exert a pressure on the fabric and sheet and firmly press the fabric into the adhesvie. This pressure, however, is exerted only on a portion of the fabric 15 and lining 16 so that both the edges 18 of the fabric and the edges 19 of the lining will be free and unattached. In this connection, it will be observed from Fig. 1 that the sheet or lining 16 is of greater width than the fabric 15. After the fabric 15 and sheet 16 have been thus secured together, the edges 19 are folded back over the sheet 16 as illustrated in Fig. 2 thus bringing the adhesive coated side of the folded portion uppermost. The material is then folded longitudinally as illustrated in Fig. 3 so that the two edges 19 will be superimposed on each other, leaving the edges 18 of the fabric extending beyond the lining. The material is then cut into suitable lengths and the edges 18 joined together by means of stitching 20. This stitching, however, does not pass through the lining. We now have a tubular member having a fabric outside and a moisture proof lining. We next take a strip of material, similar to the material out of which the sheet 16 is made, and fold it into the form of a V shaped member 21 as illustrated in Fig. 4, a portion of the outer face of each side of this member is provided with a non-hardening adhesvie 22 so that the upper portion adjacent the bend will be left free of any adhesive. This member is then inserted in one end of the tube which has been previously formed by sewing the edges 18 together and inside of the lining 16. A line of stitching 23 is then run across the tube, this stitching passing through the fabric casing, the lining and the flexible insert, as in Fig. 7, leaving a loop projecting upward and inside the tube, this loop being free and unattached, the purpose of which will be explained later. It will be noted from this construction that the lining 16 adjacent the seam or stitching 20 is merely held together by means of the non-hardening adhesive and when the bag or container is filled, a flexible or compensating joint will result to take care of any expanding or stretching of the fabric casing. This is fully illustrated in Fig. 13 and is permitted by reason of the non-hardening adhesive which permits the lining to have a sort of unrolling action along the seam at the outer edge only so that it will always follow and pack closely along the seam but at no time will the joint of the two edges 19 open up from the inside of the package or container.

When the container is filled, the insert 21 will mash down and lie closely along the lining 16 as illustrated in Fig. 8. In this connection we desire to state that the adhesive 22 coated on this strip extends upward far enough so as to be in contact with the lining above the seam or stitching 23, thus effectively preventing any air or moisture from entering the inside of the container through the perforations made by the sewing needle.

In Fig. 9 we have shown a bag constructed in a slightly different manner. After the edges 19 of the lining 16 have been folded over as illustrated in Fig. 10 thus leaving the edges 18 of the woven fabric projecting beyond, this part of the construction is the same as illustrated in Fig. 2. The sheet thus prepared is cut so that it will be twice the length of the completed container. It is then folded upon itself as illustrated in Fig. 9 thus forming a container in which the lining has a seam or joint on both edges. The projecting edges 18 are then united by means of stitches 24, thus making a container which is sewed along both sides or edges but which has a continuous or uninterrupted bottom 25. See Fig. 12. The action of the seam or connection of the edges 19 when the container is charged with a commodity in following out any stretching or expansion of the fabric casing is the same as previously described.

In order to close either type of bag and make the same air-tight, various methods may be employed. The simplest, however, being to first fold the open end over upon itself as illustrated in Fig. 14 and then gather it and secure a tie 26 around this folded over end, this tie being preferably wire as we can by this method obtain a very tightly drawn tie and one which is not apt to become loosened or break. This method of securing the open end makes it substantially air and moisture tight.

While we have shown our device as having only a single thickness for the lining, it is obvious that we may make two or three sheets of lining of either the same or different material and unite them by means of a moisture-proof adhesive. It is to be understood, of course, that the non-drying adhesive referred to in the specification be also of such that it will tend to make the lining moisture proof. While we have shown rollers for uniting or pressing the lining and the woven fabric together, still it is obvious that other apparatus may be used for this purpose as for instance a plain press or the sheet of lining may be laid on a table, the fabric placed thereon and united by means of a hand roller or other hand-operated device for imparting pressure sufficient to force the fabric into the adhesive.

We may also, if desired, coat the flexible insert 21 completely and treat a portion of both outside faces adjacent the bend with soapstone or similar powder so as to prevent that portion from sticking.

Our container has the distinct advantage of being relatively cheap to manufacture, occupying very little storage space and also permitting a great number to be shipped simultaneously. In other words, many thousands of our containers can be shipped in a car whereas only a few metal or wood containers can be shipped in the same amount of space.

The characteristic feature of our improvement is in so securing the lining to the fabric as to leave a portion of the lining loose and detached from the fabric to take care of the stretching of the fabric without imparting undue strain on the lining. In practice, this unattached portion of the lining is preferably along the side seam, thus forming a compensating inner seal along said seam, so arranged that all the strain or stress of the contents of the container is imparted to the casing leaving the lining to perform no other function than the sealing action against moisture and air.

While we have shown one conventional way of closing the open end of the bag, it is to be understood that our containers are shipped empty and open to the user and are filled and closed by him.

It will be observed from the foregoing that our container, constructed as herein described, is not only moisture proof but is airtight and sift proof.

Having fully described our invention, what we claim is:—

1. A flexible moisture proof container comprising an outer sheet or layer of woven fabric and an inner sheet of moisture proof material secured to said woven fabric material by an adhesive, the longitudinal edges of the inner sheet of moisture-proof material being unattached to the woven fabric material and connected to each other by a nondrying adhesive so as to form a compensating connection therebetween whereby the pressure of the contents of the container may partially separate the connection without tearing the moisture proof material or completely destroying the connection between the free ends of the moisture proof material.

2. A flexible moisture proof container comprising an outer sheet or layer of woven fabric and an inner sheet of moisture proof material applied to said woven fabric material by a moisture-proof adhesive, the edges of the sheet being unattached to the woven fabric material and connected to each other by a nondrying adhesive so as to form a compensating connection therebetween whereby the pressure of the contents of the container may partially separate the connection without tearing the moisture proof material or completely destroying the connection between the free ends of the moisture proof material.

3. A flexible moisture proof container comprising an outer sheet or layer of woven fabric and an inner sheet of paper applied to said woven fabric material by a moisture-proof, non-hardening adhesive, the edges of the sheet of paper being unattached to the woven fabric material and connected to each other by a non-hardening adhesive so as to form a compensating connection therebetween whereby the pressure of the contents of the container may partially separate the connection without tearing the paper or completely destroying the connection between the free ends of the paper.

4. A flexible moisture proof container comprising an inner moisture proof sheet of material formed of paper and having inwardly projecting marginal folds formed on the longitudinal edges of said paper and united together by an adhesive of sufficient adhesion to permit the partial separation of said inturned marginal folds without tearing the paper, and an outer casing of woven fabric material secured to the outside surface of the paper.

5. A moisture proof container comprising an outer casing of woven material, an inner casing of moisture proof material, said moisture proof material being partially attached to the inside of said outer casing and having its edges free and unattached to said outer casing but flexibly secured together so that the stress of the contents of the container will partially separate said edges and the stress exerted by said contents is imparted to the outer casing only.

6. In a flexible container comprising an outer casing formed of woven fabric, and an inner moisture-proof casing secured to said outer casing and having unattached expansible edge portions, said edge portions being secured together by a non-drying adhesive and being arranged in alignment with the seam formed in said outer casing of the container whereby said edges can spread and partially detach under the stress of the contents of the bag so that said stress will be imparted to the outer casing only.

7. A flexible moisture proof container comprising an outer casing, an inner moisture proof casing, said inner moisture proof casing having its longitudinal edges unattached to the outer casing and being free to expand independently of the outer casing by the stress of the contents of the container, a line of stitching for closing one side of the container, a filler provided with a moisture proof adhesive located in one end of the container, and a line of stitching passing through the outer casing, the inner moisture proof casing and the filler for uniting the same together.

8. A flexible moisture proof container comprising an outer casing, an inner moisture proof casing, inwardly projecting marginal folds formed on the edges of said inner casing and united together by a non-drying adhesive of sufficient adhesiveness to permit the partial separation of said inturned marginal folds without tearing the moisture proof inner lining, said edges being unattached to the outer casing, and a filler having a non-drying adhesive applied thereto located in the lower end of said container for rendering the same sift-proof, and a line of stitching for securing the filler in position.

9. A flexible moisture proof container comprising an outer woven fabric casing, a line of stitching for securing the free edges of said casing together, an inner moisture proof casing having a portion thereof adjacent the seam unattached to the outer casing, said unattached portion of the inner casing being held together by a non-drying adhesive and capable of being expanded by the contents of the container while the same is being filled whereby the stress of the contents of said container is imparted only to the casing.

10. A moisture-proof flexible container comprising a casing permanently closed on its sides and at one end, and a moisture proof liner having a non-drying adhesive coated face within said casing, said liner being secured to said casing throughout its surface except along its longitudinal edges, said edges being adhesively united whereby said edge is capable of partial separation and expansion and all the stress exerted by the contents of the container when filled is imparted to the casing.

11. A moisture proof flexible container comprising a casing open at one end, a tubular liner having a free and expansible longitudinal edge secured in said casing, an insert located at one end of said liner for closing the same, means for securing said insert and liner together so as to make an air and moisture proof joint, said expansible edge adapted to permit the liner to expand when the container is being charged whereby all stress exerted by the contents of the container is exerted on the casing and the consequent rupturing of the liner prevented.

12. A flexible container comprising an outer casing, an inner casing secured to said outer casing by an adhesive, the longitudinal edges of said inner casing being unattached to the outer casing and connected to each other by a nondrying adhesive so as to form a compensating connection therebetween whereby the pressure of the contents of the container may partially separate the connection without rupturing the inner casing or destroying the connection between the longitudinal edges thereof.

13. A flexible container having an adhesive coated inner casing secured therein throughout its surface except along its longitudinal edges, the longitudinal edges of said casing being inturned and connected together by a nondrying adhesive so as to form a compensating connection therebetween whereby the pressure of the contents of said container may separate the outer edges of said connection without entirely destroying the connection between the inturned edges or rupturing said inner casing.

14. A moisture-proof flexible container comprising an outside flexible casing stitched along one of its vertical edges, an inner lining formed of moisture-proof material secured to said outer casing throughout its length and width except adjacent the stitching, and a folded portion carried by said inner lining and extending along said stitched edge, said folded portion being free and unattached to said outer casing and adapted to move outward toward the vertical stitched edge of the outer casing when the container is filled whereby rupture of and strain on the inner lining is prevented.

15. A flexible moisture-proof container comprising an outside casing formed of woven fabric seamed along certain edges, an inner moisture-proof lining secured to said fabric casing, and a folded moisture-proof adhesive insert carried by said moisture-proof lining along at least one of said seams, said insert being adhesively attached to said lining and having said folded edge within said container.

16. A moisture-proof flexible container comprising an outside casing formed of fabric seamed along certain edges, an inner moisture-proof lining secured to said fabric lining, and a folded moisture-proof insert carried by said lining along at least one of said seams, said insert being adhesively attached to said lining and having the stitching of the seam passing therethrough adjacent its outer edges.

17. In a moisture-proof container of the class described, an outer fabric casing having a seam along at least one of its edges, an inner moisture-proof lining secured to said fabric casing, and a folded adhesive insert extending along said seam and having its folded edges within said container, for protecting said seam.

18. In a moisture-proof container of the class described, an outer fabric casing having a seam along at least one of its edges, an inner moisture-proof lining secured to said casing, and a folded insert incorporated in said seam and extending inwardly therefrom and having its folded edge within the container, for protecting said seam.

19. In a moisture-proof container of the class described, an outer fabric casing having a seam along at least one of its edges, an inner moisture-proof lining secured to said casing, and an insert for protecting said seam, comprising a strip folded upon itself to provide a bight projecting inwardly within the container, the free edges of said insert being secured in said seam.

20. In a moisture-proof container of the class described, an outer fabric casing having a seam along at least one of its edges, an inner moisture-proof lining secured to said casing, an insert for protecting said seam, comprising a strip folded upon itself to provide a bight projecting inwardly within the container adapted to flatten out under pressure of material introduced into the container to bridge the seam, the free edges of said insert being secured in said seam.

In testimony whereof we have affixed our signatures.

ALVIN C. CARPENTER.
ROBERT E. PIERCE.
CHARLES V. BRADY.
HOMER V. HOWES.